United States Patent [19]
Elliott

[11] Patent Number: 5,339,338
[45] Date of Patent: Aug. 16, 1994

[54] APPARATUS AND METHOD FOR DATA DESYNCHRONIZATION

[75] Inventor: Paul M. Elliott, Jenner, Calif.

[73] Assignee: DSC Communications Corporation, Plano, Tex.

[21] Appl. No.: 957,223

[22] Filed: Oct. 6, 1992

[51] Int. Cl.$^5$ .............................................. H04L 7/00
[52] U.S. Cl. ...................................................... 375/118
[58] Field of Search ............... 375/118, 114, 110, 111, 375/112, 120; 370/105.3, 102

[56] References Cited

U.S. PATENT DOCUMENTS

| | | | |
|---|---|---|---|
| 4,347,620 | 8/1982 | Black et al. | 375/112 |
| 4,434,498 | 2/1984 | Mathieu | 375/114 |
| 4,716,575 | 12/1987 | Douros et al. | 375/118 |

Primary Examiner—Tesfaldet Bocure
Attorney, Agent, or Firm—Baker & Botts

[57] ABSTRACT

Apparatus and a method desynchronizes data by providing a high resolution FIFO depth measurement. A numerically controlled oscillator is combined with a FIFO memory to implement a variable frequency transmit clock signal having virtually unlimited frequency and phase resolution.

15 Claims, 2 Drawing Sheets

APPARATUS AND METHOD FOR DATA DESYNCHRONIZATION

TECHNICAL FIELD OF THE INVENTION

This invention relates in general to the field of electronic circuits. More particularly, the present invention relates to apparatus and a method for data desynchronization.

BACKGROUND OF THE INVENTION

A desynchronizer is commonly used in the telephony industry to convert a data stream of varying instantaneous frequency into a data stream of fixed frequency. Typically, a first-in first-out memory (FIFO) is used as an intermediate data buffer and a phase-locked loop feedback technique is used to control the desynchronizer output frequency. Analog phase detector techniques have been used in conjunction with analog filters and analog oscillators to implement the phase-locked loop circuitry. Because of component count and cost considerations in addition to tolerance errors of an analog design, it is desirable to implement the phase-locked loop circuitry digitally.

Conventional digital implementations have generally required very high clock frequencies in order to obtain the phase resolution needed for the phase-locked loop feedback computations. For example, to obtain a phase resolution of one-sixteenth unit interval of a 1.544 MHz clock, a high speed sample clock of 24.704 MHz is required. The high clock frequency requirements are disadvantageous due to the amount of power typically required to generate them, high levels of interference noises associated therewith, and generally require more expensive circuit components.

Accordingly, it has become desirable to provide apparatus and a method for monitoring the depth of a desynchronizer FIFO with fractional-bit resolution without requiring excessively high internal clock frequencies.

SUMMARY OF THE INVENTION

In accordance with the present invention, apparatus and a method for data desynchronization are provided which substantially eliminate or reduce disadvantages and problems associated with prior circuits.

In one aspect of the present invention, a numerically controlled oscillator producing a periodic wave and a phase fraction output is coupled to a FIFO. The FIFO receives an input stream of varying instantaneous frequency. An output circuit produces a delta phase output in response to the phase fraction output and the fullness of the FIFO. The output circuit further produces a transmit clock in response to the periodic wave and transmits data stored in the FIFO synchronously with the transmit clock.

An important technical advantage of the present invention is its ability to desynchronize and retransmit a data stream with improved stability and noise characteristics. Furthermore, the need for a costly high frequency internal clock in conventional circuits are obviated.

BRIEF DESCRIPTION OF THE DRAWINGS

For a better understanding of the present invention, reference may be made to the accompanying drawings, in which.

DETAILED DESCRIPTION OF THE INVENTION

Figure 1:
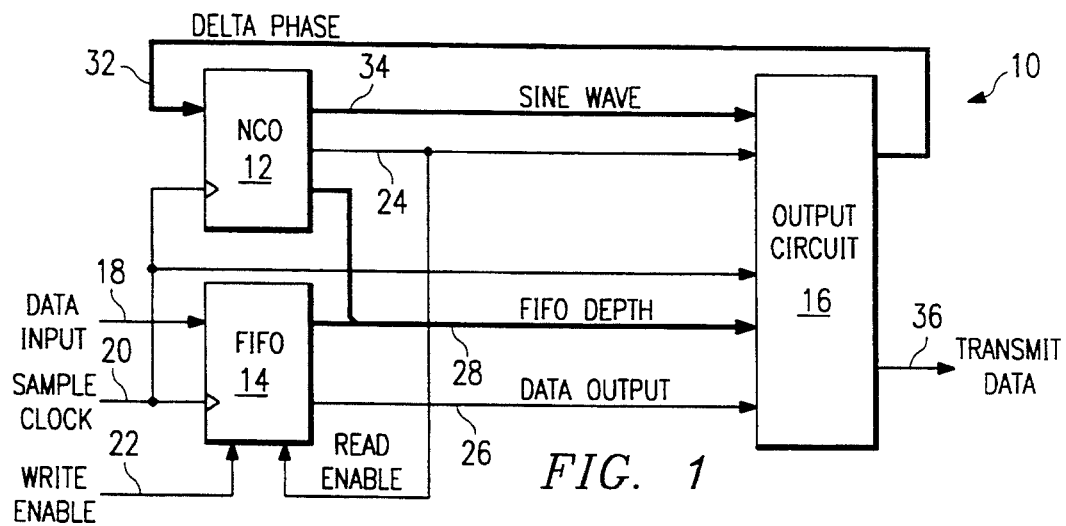
FIG. 1 is a simplified block diagram of a preferred embodiment of the present invention.

With reference to the drawings, FIG. 1 illustrates a preferred embodiment of the apparatus and method for providing fractional-bit resolution FIFO depth in a desynchronizer, indicated generally at 10 and constructed according to the teaching of the present invention. A numerically controlled oscillator (NCO) 12, or also commonly called a direct digital synthesizer (DDS), is coupled to a FIFO 14 and an output circuit 16. Data input 18 consists of a data stream with varying instantaneous frequencies. Typically, data input 18 contain bursts of data. A sample clock signal 20 of a predetermined frequency is used to synchronize NCO 12, FIFO 14 and output circuit 16. Data input 18 is written into FIFO 14 at a predetermined logic level of a write enable signal 22, and a read enable signal, derived from an output signal 24 from NCO 12, controls a data output 26 from FIFO 14. Output signal 24 is also provided to output circuit 16. The manner in which signal 24 is generated is discussed below.

A high resolution FIFO depth 28 is obtained from outputs from NCO 12 and FIFO 14, and provided to output circuit 16. A delta phase output 32 from output circuit 16 is fed back to NCO 12. NCO 12 further produces and provides a sine wave output 34 to output circuit 16. Output circuit 16 produces a transmit data stream 34 for retransmission in response to its inputs 20, 24, 26, 28, and 34. It is important to note that other periodic functions and methods for producing the same may be used.

Figure 2:
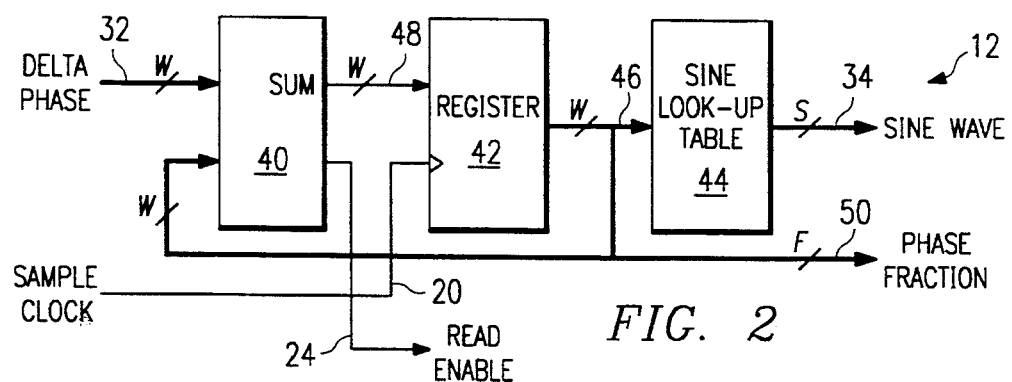
FIG. 2 is a more detailed block diagram of a preferred embodiment of a numerically controlled oscillator.

Referring to FIG. 2, where like numerals refer to like components and signals, a more detailed block diagram of NCO 12 is shown. NCO 12 is preferably made up of an adder 40, a register 42, and a sine look-up table 44. Adder 40 receives a first addend of width w, delta phase 32, from output circuit 16. A second addend, also of width W, is received from an output 46 of register 42. The sum 48 from adder 40 is provided as input to register 42. Read enable signal 24 is preferably generated by adder 40 when it overflows. Register 42 is preferably implemented by D-type flip-flops being clocked by sample clock signal 20 at a predetermined edge or logic level thereof. A predetermined subset, of width F, of the output 46 of register 42, is a linear phase fraction output 50. As seen in FIG. 1, phase fraction 50 is combined with outputs from FIFO 14 to form FIFO depth 28, which is received by output circuit 16. Output 46 from register 46 is provided to a circuit such as a sine look-up table 44 to produce a sine wave output 34. Sine wave output 34 is a step approximation of a sine wave with $2^S$ steps, where S is the width of sine wave output 34. Note that other periodic functions may be similarly utilized.

In operation, delta phase input 32 is added to phase fraction output 50, the resulting sum from which becomes the new phase fraction 50 when register 42 is sampled by sample clock 20. By this process, phase fraction output 50 increases uniformly each sample clock cycle, until adder 40 overflows (modulo $2^W$), beginning a new cycle. The value of phase fraction 50 represents the instantaneous phase of transmit data 36. By selecting the value of delta phase 32, the output frequency can be controlled over a wide range in a manner completely synchronous with sample clock signal 20. The frequency and phase resolution of NCO 12 can be determined by selecting the width F of phase fraction 50. NCO 12 output frequency can range from 0 Hz to one-half of sample clock frequency, in steps of (sample clock/$2^W$).

As seen from the foregoing, NCO 12 is used to generate an output clock. The phase resolution is determined by the width of adder 40. For example, an output clock may be generated with width W equal 24 bits with sample clock frequency of 4.096 MHz. The 24-bit phase fraction provides a resolution of $\frac{1}{2}^{24}$ cycle. In comparison, to achieve comparable resolution with conventional techniques would require a clock frequency of approximately 25,904 GHz. It is important to note that commercially prepared NCOs can be utilized if they provide the functions and output signals as discussed above.

Figure 3:
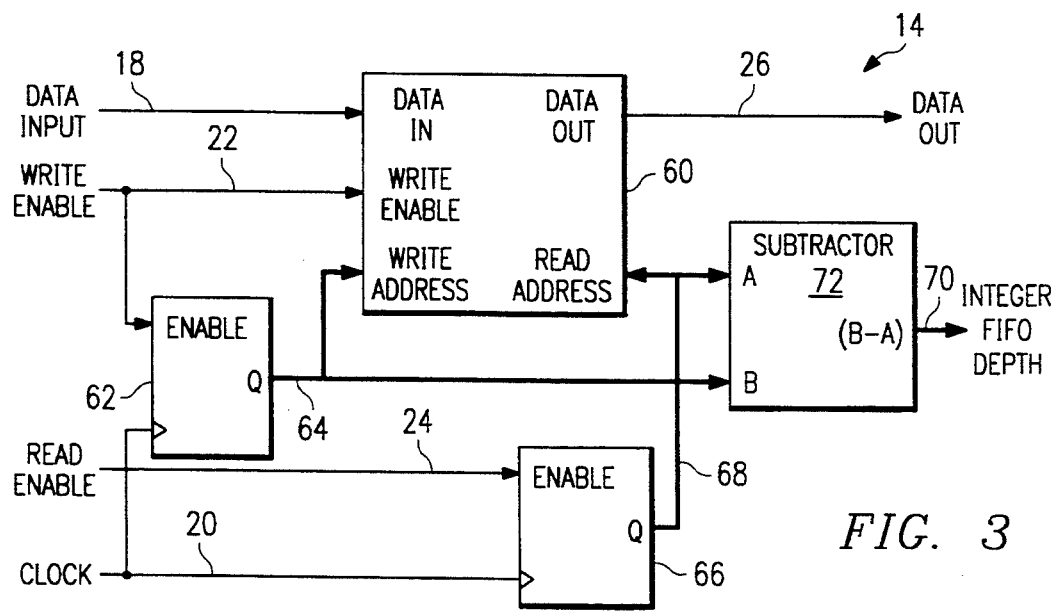
FIG. 3 is a more detailed block diagram of a preferred embodiment of a first-in first-out memory.

Referring to FIG. 3, a simplified block diagram of a preferred embodiment of FIFO 14 is shown. Data input 18 is written into a memory 60, which is shown as a dual-port random access memory but may be implemented by other types of memory devices as well. A write counter 62 counts up each time write enable 22 is active and generates a write address 64. A read counter 66 counts up each time read enable 24 is active and similarly generates a read address 68. Preferably, read enable 24 is generated by NCO 12, which is active once per NCO output cycle when adder 40 overflows.

An integer FIFO depth output 70 is generated by a subtractor 72, which computes the difference between write address 64 from read address 68. Therefore, integer FIFO depth 70 reflects how full memory 60 is. Integer FIFO depth 70 functions as a portion of the phase detector in the phase-locked loop, with causes the transmit output clock to vary in frequency so as to maintain memory 60 at approximately half full or at any other desired level, and thus matching the average input and output frequencies. As can be seen from the foregoing, a commercially prepared FIFO may be used if it supplies a signal similar to that of integer FIFO depth 70, or alternatively provides write and read addresses 64 and 68 from which integer FIFO depth 70 may be derived.

Figure 4:
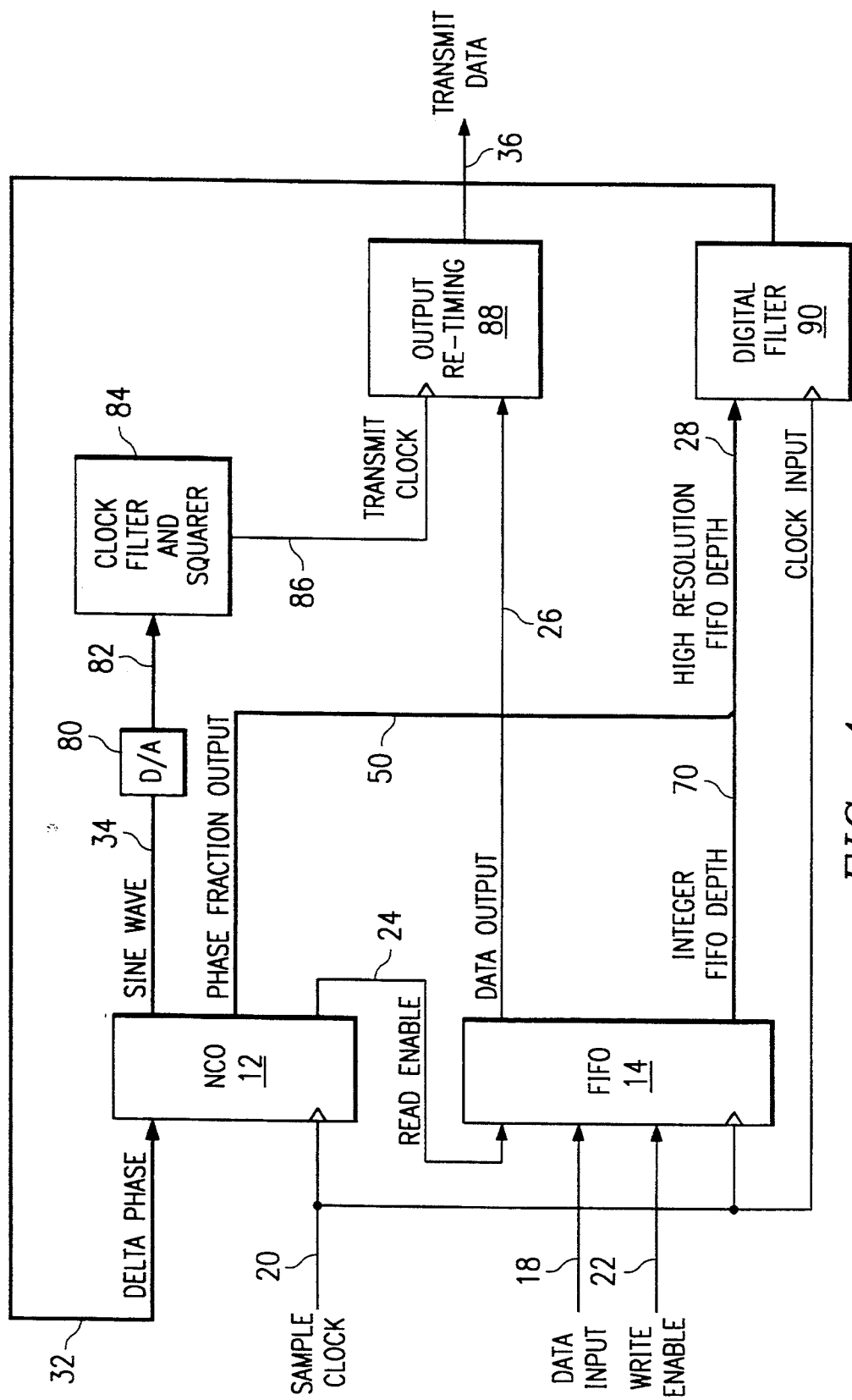
FIG. 4 is a more detailed block diagram of the preferred embodiment of the present invention.

Referring to FIG. 4, a more detailed block diagram of the preferred embodiment of apparatus 10 is shown. Sine wave output 34 from NCO 12 is provided to a digital to analog converter (D/A) 80, which converts sine wave output 34 into an analog signal 82. Analog sine wave output 82 is fed into a clock filter and squarer circuit 84. Clock filter and squarer circuit 84 preferably includes an analog filter, such as a low pass filter or band pass filter, to smooth out analog sine wave 82 and to produce a high resolution sine wave. This high resolution sine wave is then fed to a conventional comparator or slicer circuit, which produces a square wave in response. The square wave is transmit clock signal 86, which is used to clock an output re-timing circuit 88. Output re-timing circuit 88 may be implemented by a D-type flip-flop, which receives data output 26 as the input. Accordingly, the output of output re-timing circuit 88 is transmit data 36.

As discussed above, phase fraction output 50 from NCO 12 and integer FIFO depth 70 from FIFO 14 are combined to form high resolution FIFO depth 28, which is provided to a digital filter 90. Digital filter 90 may be implemented with a finite impulse response filter as known in the art. Digital filter 90 provides further processing of high-resolution FIFO depth 28, such as removing any high frequency jitter, or mapping jitter.

In operation, apparatus 10 functions as a phase-locked loop, where integer FIFO depth 70 and NCO phase fraction 50 are used to create a high resolution phase detector. Delta phase 32 from digital filter 90 is then used to control the frequency of NCO 12. In effect, the rate at which memory 60 is read is matched with its write rate, where the read rate is determined by the output frequency of NCO 12. As constructed in accordance with the preferred embodiment of the present invention, NCO 12, FIFO 14 and digital filter 90 are running synchronously with the common clock edge or level of a common sample clock 20, and the outputs are therefore fully synchronous.

Although the present invention has been described in detail, it should be understood that various changes, substitutions and alterations can be made thereto without departing from the spirit and scope of the present invention as defined by the appended claims.

What is claimed is:

1. Apparatus for data desynchronization, comprising:
a numerically controlled oscillator producing a periodic wave function and a phase fraction output;
a first-in first-out memory, coupled to said numerically controlled oscillator, receiving a data input stream and producing data output stream and a first-in first-out memory depth output; and
an output circuit coupled to said numerically controlled oscillator and first-in first-out memory and receiving and combining said phase fraction output and said first-in first-out memory depth output to produce a jitter-free delta phase output for controlling said numerically controlled oscillator, said output circuit further receiving said periodic wave function from said numerically controlled oscillator and producing a high resolution transmit clock in response thereto, and further receiving said data output stream from said first-in first-out memory and retransmitting it in response to said transmit clock.

2. The apparatus, as set forth in claim 1, wherein said numerically controlled oscillator further comprises:
an adder producing a sum of a first and second addend inputs;
a register for receiving said sum from said adder, and producing an output in response to a clock signal, said adder receiving said delta phase output at said first addend input and said register output at said second addend input; and
a circuit receiving said register output and producing said periodic wave function in response thereto.

3. The apparatus, as set forth in claim 2, wherein said circuit is a look-up table.

4. The apparatus, as set forth in claim 1, wherein said output circuit comprises a clock filtering circuit receiving said periodic wave function and producing said high resolution transmit clock signal in response thereto.

5. The apparatus, as set forth in claim 4, wherein said output circuit further comprises an output re-timing circuit for receiving said data output stream from said first-in first-out memory and retransmitting said data in response to said high resolution transmit clock.

6. The apparatus, as set forth in claim 1, wherein said output circuit comprises a filtering circuit receiving said first-in first-out memory depth and said phase fraction output from said numerically controlled oscillator for further processing and producing said jitter-free delta phase output.

7. The apparatus, as set forth in claim 1, wherein said first-in first-out memory comprises:
- a memory for storing said data input stream upon a write enable signal and outputting said data input stream upon a read enable signal;
- a write counter receiving said write enable signal and generating a write count;
- a read counter receiving said read enable signal and generating a read count; and
- a subtractor for computing a difference between said write count and read count for generating said first-in first-out memory depth.

8. A method for data desynchronization, comprising the steps of:
- receiving an input data stream of varying instantaneous frequencies;
- writing said received input data stream in a first-in first-out memory;
- detecting the fullness of said first-in first-out memory;
- combining the detected fullness with a phase fraction output from a numerically controlled oscillator and producing a high resolution first-in first-out depth;
- feeding back said high resolution first-in first-out depth to said numerically controlled oscillator and producing a periodic wave function;
- producing a transmit clock signal from said periodic wave function; and
- retransmitting said written input data stream from said first-in-first-out memory synchronously with said transmit clock signal.

9. The method, as set forth in claim 8, wherein said periodic wave producing step comprises the steps of:
- removing high frequency jitters from said high resolution first-in-first-out depth to produce a jitter-free depth;
- adding said jitter-free depth and said phase fraction output and producing a sum; and
- using said sum to index a periodic wave look-up table to produce said period wave function synchronously with a sample clock signal.

10. The method, as set forth in claim 9, further comprising the step of reading from said first-in first-out memory in response to said sum being greater than a predetermined overflow value.

11. The method, as set forth in claim 10, wherein said fullness detecting step comprises the steps of:
- counting the number of writes into said first-in first-out memory;
- counting the number of reads from said first-in first-out memory; and
- computing a difference between said numbers of reads and writes.

12. The method, as set forth in claim 8, wherein said transmit clock signal producing step comprises the steps of:
- converting said periodic wave function to an analog periodic function;
- filtering said analog periodic function; and
- converting said analog periodic function to a square wave transmit clock signal.

13. A method for desynchronizing an input data stream, comprising the steps of:
- writing said input data stream in a first-in first-out memory;
- detecting the fullness of said first-in first-out memory;
- generating a periodic function and a phase fraction thereof;
- combining the detected fullness with said phase fraction and producing a high resolution first-in first-out depth;
- controlling said periodic wave generating step in response to said high resolution first-in first-out depth;
- producing a transmit clock signal from said periodic wave function; and
- retransmitting said written input data stream from said first-in first-out memory synchronously with said transmit clock signal.

14. The method, as set forth in claim 13, wherein said periodic wave producing step comprises the steps of:
- removing high frequency jitters from said high resolution first-in-first-out depth to produce a jitter-free depth;
- adding said jitter-free depth and said phase fraction and producing a sum; and
- using said sum to index a periodic wave look-up table to produce said period wave function synchronously with a sample clock signal.

15. The method, as set forth in claim 14, further comprising the step of reading from said first-in first-out memory in response to said sum being greater than a predetermined overflow value.

* * * * *